United States Patent
Leymann et al.

(10) Patent No.: US 6,820,118 B1
(45) Date of Patent: Nov. 16, 2004

(54) METHOD AND SYSTEM FOR PROVIDING A LINKAGE BETWEEN SYSTEMS MANAGEMENT SYSTEMS AND APPLICATIONS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,509

(22) Filed: Jan. 20, 2000

(30) Foreign Application Priority Data

Jan. 20, 1999 (EP) ............................................. 99100928

(51) Int. Cl.⁷ ............................................. G06F 15/173
(52) U.S. Cl. ..................................................... 709/223
(58) Field of Search .............................. 705/7, 9, 223; 709/223, 224

(56) References Cited

U.S. PATENT DOCUMENTS

| | | | |
|---|---|---|---|
| 5,696,701 A | * 12/1997 | Burgess et al. | 714/25 |
| 5,721,913 A | * 2/1998 | Ackroff et al. | 707/103 R |
| 6,026,500 A | * 2/2000 | Topff et al. | 714/26 |
| 6,230,198 B1 | * 5/2001 | Dawson et al. | 709/224 |
| 6,349,238 B1 | * 2/2002 | Gabbita et al. | 700/101 |

OTHER PUBLICATIONS

Huhns. M. et al. "Workflow Agents," Internet Computing [downloaded from IEEE Library]. vol. 2, No. 4, Jul./Aug. 1998, pp. 94–96.*

Kellogg. L. et al. "Interface Management: A CORBA Universal Service Manager," Proc. of IEEE 3rd Int'l Workshop on Systems Management. [downloaded from IEEE Library]. Apr. 22–24, 1998, pp. 148–149.*

Ray. P. "Designing Enterprise– Oriented Network Management Applications," IEEE Global Telecommunications Conference (GLOBECOM 98). [downloaded from IEEE Library]. vol. 2, Nov. 8–12, 1998, pp. 1279–1284.*

FlowMark Modeling Workflow, Part No. 10H0952, Program No. 5622–615 for OS/2 and 5765–468 for AIX.

MQSeries Workflow, "Concepts and Architecture", Version3.2.1.

IBM MQSeries Workflow, "Getting Started with Buildtime", Version 3.2.1.

IBM MQSeries Workflow, "Getting Stared with Runtime", Version 3.2.1.

IBM Technical Disclosure Bulletin, "Workflow Management Based on an Object–Oriented Paradigm", vol. 37, No. 03, Mar. 1994, p. 185.

Editorial: by Ronni T. Marshak, "Workflow as Middleware", Workgroup Computing Report, vol. 17, No. 5, pp. 2–13.

IBM Technical Disclosure Bulletin, D.J., Spohn, vol. 32, No. 9A, Feb. 1990, pp. 250–254.

(List continued on next page.)

Primary Examiner—Susanna Meinecke-Diaz
(74) Attorney, Agent, or Firm—Scully, Scott, Murphy & Presser; Derek S. Jennings (57) ABSTRACT

An improved consistency is provided between systems management systems (SMS) and workflow management systems (WFMS) by a linkage between the two. A tight, integrative linkage is provided which is managed and maintained automatically by the application, particular by the WFMS, or alternatively by the SMS. This provides a consistent business process oriented view of the SMS monitored resources, including information technology resources, such as programs, and WFMS monitored resources, including organization resources such as people. This is achieved by either of enhancing the application's monitor to include the functionality of the enterprise console; or enhancing the enterprise console to include the functionality of the WFMS's process monitor; and profiting from the merged information of both the SMS and the WFMS.

8 Claims, 4 Drawing Sheets

OTHER PUBLICATIONS

"Business Process Management With FlowMark", Frank Leymann, Dieter Roller, IBM Germany Development, Inc., pp. 230–234.

"A Meta Model To Support Modelling And Execution Of Processes", Frank Leymann, pp. 287–294.

IBM Systems Journal, "Managing business processes as an information resource", by F. Leymann, W. Altenhuber, vol. 33, No. 2, 1994, pp. 326–348.

"Verifikation von Workflows in IBM FlowMark", pp. 20–368.

* cited by examiner

METHOD AND SYSTEM FOR PROVIDING A LINKAGE BETWEEN SYSTEMS MANAGEMENT SYSTEMS AND APPLICATIONS

BACKGROUND OF THE INVENTION

1. Technical Field

The present invention relates to a method and system for providing improving interaction between systems management systems and their respective distributed applications running in networked computer systems. In particular, the present invention relates to a method and system for providing an improved consistency between systems management systems and their respective distributed applications.

2. Prior Art

The subject matter of the present invention is applicable to a broad variety of applications, i.e. whenever the availability of an application is monitored by systems management systems, further referred to as SMSs.

It is particularly applicable for applications having a distributed nature and running in a distributed environment on a plurality of workstations hosting some copy of said distributed application.

Further, workflow management systems, referred to herein as WFMSs, are very preferred objects for being subjected to the improvements of the present invention. But basically, every system which is able to be described with the basic structure and terminology of workflow management systems, further referred to as WFMSs herein, can advantageously be improved by applying the method according to the invention. For the single reason of clear terminology, and thus improved clarity, the present invention will be disclosed herein in detail applied to WFMSs and with the terminology of SMS of Tivoli Systems Inc.

A new area of technology with increasing importance is the domain of Workflow-Management-Systems (WFMS). WFMS support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development or production processes, is of enormous importance for a company and has significant influence on a company's overall success in the market place. Therefore, those processes have to be regarded similar as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms and documentation for IBM FlowMark is available in every IBM branch.

In F. Leymann: "A meta model to support the modeling and execution of processes", Proceedings of the 11$^{th}$ European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQSeries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented withing the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable form. At run time, an instance of the process is created from the process model, called a process instance. This process instance is then interpreted dynamically by the IBM FlowMark product.

Generally speaking, workflow management, as for example implemented by IBM FlowMark, can be regarded as involving three dimensions.

The first dimension, the process logic dimension describes the actions to be performed, by whom they have to be performed, with which program they have to be performed, and in which sequence they have to be performed.

The second dimension describes the organizational structure, the people and the roles the people are playing.

The third dimension describes the information technology (IT) infrastructure, such as the workflow servers, and the workstations/programs used by the users.

The actual execution of a workflow is then a series of points in the three-dimensional workflow space. Each point represents the execution of an activity by one person at one computer using a particular program.

An application monitor is the part of an application that helps in monitoring the execution of the application. In workflow systems this component is called a process monitor. It tracks and controls the correct and timely execution of business processes. To achieve that, the process monitor controls that sufficient resources are assigned to the individual activities and makes sure that the activities are carried out in a pre-defined time. If out-of-line situations occur, administration people are notified so that the appropriate corrective actions can be taken.

A user typically interacts with the workflow management system via a graphical end user interface that represents the tasks to be performed by the user as icons. Work for a particular task is started by the user by double-clicking on the appropriate icon which in turn starts the program implementing the activity.

It is important for the productivity of users that the invoked programs complete as designed and that they are not terminating prematurely as the result of a program internal or even external event, such as the breaking of a communication link or the malfunctioning of the workflow system itself. The reason for the event to happen could be either hard or software failures. Unless the problem is fixed, users are prohibited for carrying out their duty efficiently. This indicates that the IT infrastructure is as important for the correct and efficient processing of workflow as is the organization which is monitored by the process monitor.

Said availability of systems including all hard- and software is controlled and monitored by said SMSS; that means the systems management system makes sure that the monitored systems are up and running and producing correct results. System in this context means the combination of hard- and software that performs a user-specified task, such as book keeping or loan processing. In general, a system is distributed, that means individual software components are running on different processors that are connected via communication lines.

When an error is detected, typically a message is sent to the systems management system's enterprise console. This allows an operator to take appropriate actions; which actions need to be taken depends on some well in advance established procedures.

The view that the SMS's enterprises console exhibits is that of a set of hardware components and pieces of software only. It has been recognized that this view is too limited and that in order to get the whole picture one has to look at it from a business process perspective.

TME-10, a state of the art SMS product sold by Tivoli Inc., a wholly owned subsidiary of IBM Corporation, is used as the prototype of a SMS, that means its implementation and terminology, for discussing SMS properties is used herein.

It has been proposed for TME-10, whose basic structure and functions are described in more detail in the introductory section, to provide that business process perspective view as a higher level of abstraction.

This approach of presenting the managed hard- and software in a business process oriented view still has problems, however.

It only reflects the relation between the IT-infrastructure and the business processes and does not reflect other types of resources that are important for the processing of business processes, such as people working on the business processes.

It is the object of the present invention to provide a business process oriented view of both the organization and the information technology aspects together by providing a linkage between the systems management systems and the distributed applications, in particular by the WFMS. This combined view can be implemented in the systems management system's enterprise console or in the application's application monitor, for workflow systems in the process monitor.

SUMMARY OF THE INVENTION

The present invention proposes a method and system for providing an improved consistency between the SMS and the WFMS by a linkage between the two. A tight, integrative linkage is provided which can be established, managed and maintained automatically by the application, and particularly by the WFMS, or, alternatively by the SMS. This allows the provision of a consistent business process oriented view of the systems management system monitored resources, that means information technology resources, such as programs, and workflow management system monitored resources, that means organization resources, such as people. This is achieved by either of two ways:

Either, by enhancing the applications monitor in order to include the functionality of the enterprise console and taking profit from the merged information of both systems, the SMS and the WFMS; or By enhancing the enterprise console in order to include the functionality of the WFMS's process monitor and taking again profit from the merged information of both systems.

This linkage is implemented in the first alternative by establishing a notification mechanism in the SMS that informs the WFMS about all processing relevant information technology related events and by implementing in the WFMS a mechanism that understands the sent notifications and takes appropriate actions. The set of actions can range from a simple alert to operations people via the process monitor or an automatic rearrangement of staff so that the affected workflows can continue to operate.

For the second alternative, this linkage is provided by establishing a notification mechanism in the WFMS that informs the SMS about all processing relevant organization resource problems and by implementing in the SMS a mechanism that understands the sent notifications and provides the appropriate information via the SMS' enterprise console.

Regardless of the chosen alternative, such a tight linkage allows to treat hard- and software errors as well as people resource problems as errors in the execution of business processes.

The method of the present invention has the advantage, in relation to the method sketched out in the discussion of prior art technique, that a very consistent combined view of both SMS and application program, in particular the WFMS, is generated.

Thus the process of handling errors is simplified and more complete since hard- or software failures and organizational resource problems are treated equally and are managed together.

In a preferred embodiment of the invention, the present method is applied to WFMSs. This extends the advantages mentioned above for those systems.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

The following is a short outline of the basic concepts of a workflow management system based on IBM's FlowMark WFMS and the state-of-the-art SMS TME-10 by Tivoli. This will lead directly to the inventive concept:

As workflow management systems are application programs, they are concerned by the present inventions. Thus, their basic functions are shortly summarized and set in context with the underlying invention:

From an enterprise point of view, the management of business processes is becoming increasingly important: business processes or process provide for the short control of which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMS facilitates the management of business processes. It provides a means to describe models of business processes (built time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

I. Processes
II. Activities
III. Blocks
IV. Control Flows
V. Connectors
VI. Data Containers
VII. Data Structures
VIII. Conditions
IX. Programs
X. Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

I. How work is to progress from one activity to the next

II Which persons are to perform activities and what programs they are to use

II Whether any other processes, called subprocesses, are nested in the process

Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities being a step within a process represents a piece of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity What data is required as input to the activity and as output from it The activities to be performed have typically a fine structure:

An Activation Condition defines when the activity is ready for scheduling by the workflow manager; an Exit Condition defines when an activity should be treated as complete by the workflow manager. The core of the activity is the Task which is comprised of the proper activity and a query on an organization database. The Proper Activity associates the activity with a program object. The program object defines for each operating system, and possibly for each user, the name and operational characteristics for an executable piece of software. The executable piece of software is started when the activity is performed by a user. The query on the organization database defines the persons responsible for performing the activity. When the activity is ready to be scheduled, the workflow management executes the specified query against the organization database. This query returns a set of persons, to which the activity is assigned to. The task is transformed into a set of work items, one for each person selected as the result of the query against the organization database. The work item contains the name of the person and the program to be executed. These work items are made part of the users' worklist.

Each of the activities is performed by an activity implementation. The activity implementations are typically programs, but they may also be the invocation of a method object or a stored procedure in a relational data base.

The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such an activity needs to be allowed to become interrupted. Thus, termination of an activity does not necessarily indicate that the associated task has been finished successfully. In order to allow the measurement of successfulness of the work performed by an activity a Boolean expression called exit condition is associated with each activity. Exactly the activities the exit condition of which evaluated to true in the actual context are treated as successfully terminated. For determination of the actual control flow precisely the successfully terminated activities are considered. Thus the logical expression of an exit condition, if specified, must evaluate to true for control to pass from an activity or block.

Beside describing the potential flow of control and data between activities a business process model also encompasses the description of the flow of the activities itself between resources actually performing the pieces of work represented by each activity. A resource may be specified as a particular program, person, a role, or an organizational unit. At run time tasks are resolved into requests to particular persons to perform particular activities resulting in work items for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These sub-processes are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modelers are working together. It allows the team members to work independently on different activities. Program and process activities can be associated with a time limit.

The time limit specifies how long the activity may take. If the time is exceeded, a designated person is notified. If this person does not react within another time limit, the process administrator is notified. It not only helps to recognize critical situations but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface of via the callable process application programming interface. When a process is started, the start activities are located, the proper people are determined, and the activities are posted onto the work list of the selected people as work items. If a user selects the work item, i.e. the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

As already indicated above WFMS support the definition and execution of business processes. Those business processes are made up of a set of activities which are handled by different people at different places; business processes are therefore processed in most cases in a distributed environment comprising a network of a multitude of computer systems. The activities are generally implemented via programs that the user interacts with and that manage data that is associated with the process. A user typically interacts with the workflow management system via a graphical end user that represents the tasks to be performed by the user as icons. Work for a particular task is started by the user by double-clicking on the appropriate icon which in turn starts the program implementing the activity.

Figure 1:
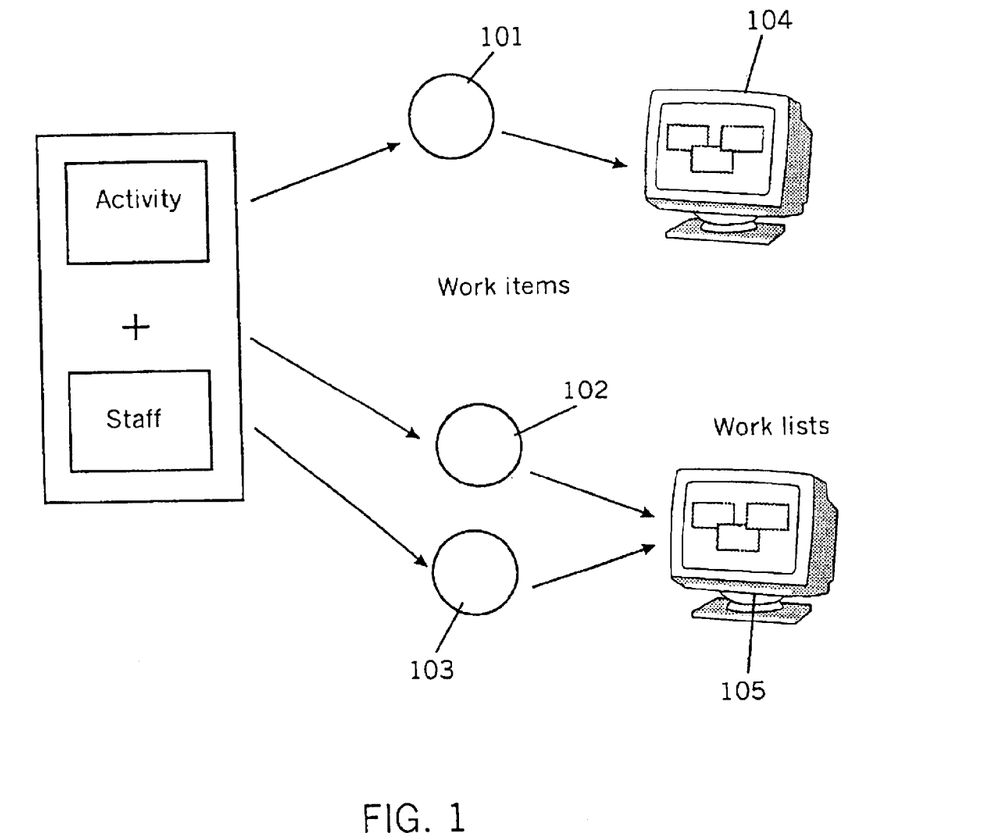
FIG. 1 is an introductory diagram reflecting the first phase of the execution of an activity in a WFMS showing the creation of work items according to prior art technique.
Figure 2:
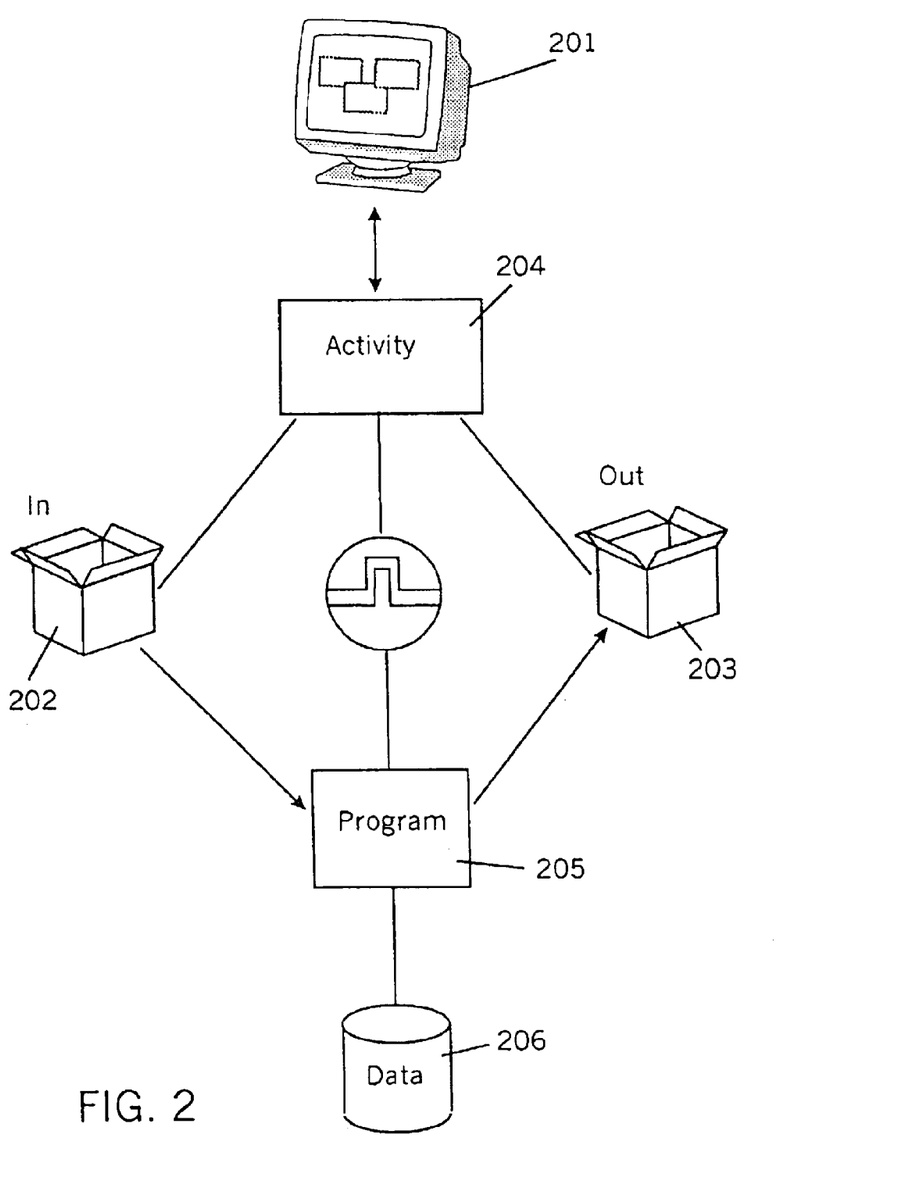
FIG. 2 is an introductory diagram reflecting the second phase of the execution of an activity in a WFMS showing the execution of an activity implementation and it's access to resource/objects by the activity implementation according to prior art technique.

The execution of an activity within a process is performed in two phases visualized in FIG. 1 and FIG. 2. FIG. 1 shows the first phase in which staff resolution is performed. When a process is defined, each activity is assigned an expression (staff assignment) that describes who should perform the activity. The staff assignment is expressed as a query against the organizational database that is part of the workflow management system. When the workflow management system navigates to an activity, it uses that query to find the people who should perform the activity (staff resolution). A work item 101, 102, 103 is created for each of the selected persons. Depending on some settings, the work item is pushed immediately onto the work list 104, 105 of a selected person, or will be made part of the user's work list as the result of an explicit request.

FIG. 2 shows the flow of control when the user starts a work item from the work list representing the second phase of execution of an activity. After double-clicking the work-item representing the execution request of the activity on the work list 201, the workflow management system materializes the input container 202 and/or output container 203 and activates the program 205 that implements the activity 204. The program that is executed typically determines it's context by obtaining some or all of the fields in the input container, interacts with the user, retrieves or modifies some resources/objects 206, or date data for short, modifies the context by storing this information in the output container, and then terminates. This constitutes the completion of the activity, and navigation through the process graph continues.

Next, the basic functions and structure of a SMS are described and are set into the context of the inventive concept.

Two basic functions are typically provided by a SMS.

Firstly, code distribution makes sure that the correct piece of code is installed at the correct level on the correct machine.

Secondly, monitoring the operation helps to ensure that all hard- and software components are running as expected. If errors are reported to the SMS, the SMS performs error management as defined by the user, including making appropriate information available at the enterprise console. Then, the console operator may take appropriate steps via SMS provided functions.

The flow of information within the SMS is as follows: The information is generated by some mechanism that is typically outside the SMS. This set of raw information must be provided to an event adapter that transforms the raw information into formatted information which can then be processed by the event server, that performs the actual processing.

The event adapter is written by the customer, i.e., the company which uses the application for performing its business processes. The event adapter processes the information coming from the event sources by first buffering them, filters the received information, selects the appropriate event server, formats the information and sends the formatted information to an event server for the actual processing.

The event server receives the information from the event adapters. The events may be logged in an event log for later queries and reference. The events are classified before a customer provided rules engine determines the actions that need to be taken. The event server also invokes the actions that are determined by the rules engine.

The actions that may be taken as a result of the rules engine processing are defined by the user. Typically a message is displayed on the enterprise console providing the console operator with the necessary information to take, if required, any resulting actions. Another common action is to invoke a program that performs all required actions automatically.

The view that the SMS exhibits is that of a set of hardware components and pieces of software. It is therefor rather difficult for the people designing the proper actions and for the master console operator to come up with the proper set of actions without doing more harm than good. The SMSs are addressing this issue by providing different levels of abstractions.

Figure 3:
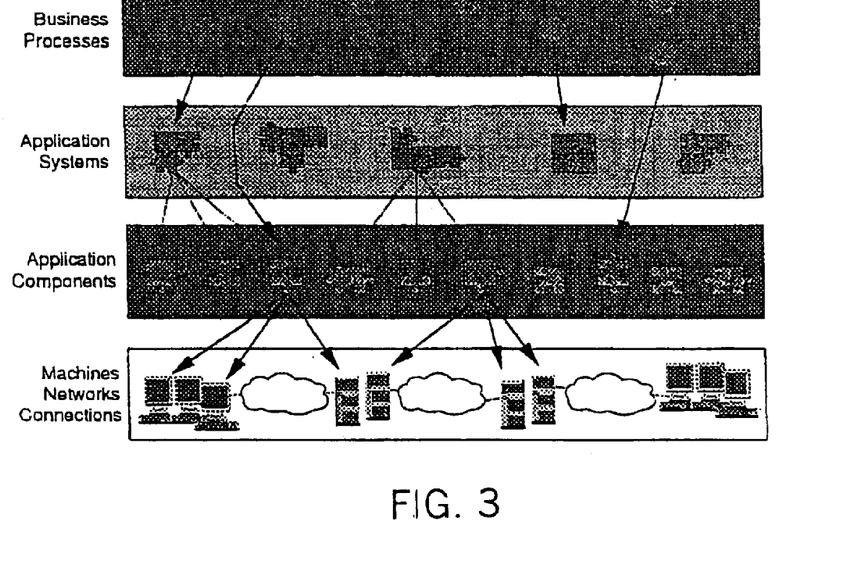
FIG. 3 is a schematic sketch showing state-of-the-art SMS.

In FIG. 3 the different levels of abstraction are shown. The lowest level represents the network; management of it is done via SMNP, the standard protocol for managing networks. On the next level are the individual software components, such as the different pieces of the operating system, the middleware components, such as database systems or WFMSs, or individual pieces of application software. The third level, that has been proposed by Tivoli, addresses the fact that application systems are made up of different components; a book keeping system for example may use a database system to store data.

Having different levels allows an easier understanding of the impact of any error situation by propagating them from the lower levels to the higher levels. This allows for example the enterprise console operator to see the impacted application system instead of just a piece of hardware that does not work properly.

Even the notion of application. systems, the level of abstraction is still below what is needed to understand the dependencies between the different pieces of software that are involved. This level of abstraction can only be achieved by looking at the system from a business process point of view. Instead of looking at the individual components, the system is viewed as a collection of business processes, where each of the business processes is connected to a set of application systems and application components.

One solution to this is to enhance the SMS enterprise console with a business process view. The SMS would need to access the WFMS's repository and use the appropriate process structures to present the managed system in the structure of business processes. If an error occurs, the appropriate activity would be shown as in error. The console operator could then dig deeper into the structures managed by the SMS and find out exactly what needs to be done.

WFMSs are pro-active systems; that means they take actions if out-of-line situations occur. To support this behavior, they allow to associate with construct of a business process appropriate performance characteristics and the action to be taken in case the specified performance characteristics are not met. One might, for example, specify that an activity must be processed within a day and if not completed in one day, that the manager of the employee assigned to the task should be informed.

The component of the WFMS that helps to manage the business processes, that means monitors and takes appropriate actions, is the process monitor. It provides an application programming interface that allows to build a graphical end user interface to assist process administrators to identify problems and to take appropriate actions.

If defined properly, either explicitly or via defaults, all errors, either hard- or software, are eventually detected by the process monitor. If, for example, a connection brakes for a program, it would show up as a problem in the throughput of the activity that is associated with the particular program. The process monitor would now help the process administrator to find out whether this is a people related problem or not. If it is not people related, the graphical end user interface could inquire the WFMS using the WFMS supplied application programming interface to identify the related activity implementation. With this information, the SMS could be contacted for further analysis.

This approach is also not completely satisfactory for basically two reasons: First, it may just take too long until an error manifests itself as a problem detected by the process monitor, and second, the appropriate setup lacks usability because two APIs are required.

It is required that any error occurring during performing an activity can be detected quickly and handled from a business point of view. Otherwise, the user is waiting unproductively before any interaction can be performed.

Thus, the present invention seeks to improve the overall performance of an application, particularly of WFMSs, by providing an improved consistency between systems management systems and their respective distributed applications.

The present invention provides a method to achieve a tight integration between the two systems. In a preferred embodiment the WFMS included the SMS pieces into its process monitor.

With general reference to the Figures and with special reference now to FIG. 4 and FIG. 5 the essential elements taking part in the inventional method for providing an improved consistency between an application program where a WFMS depicted inside a frame 8 and the SMS depicted inside a frame 9 and the respective control flow in case of an error event occurring are described below.

Figure 4:
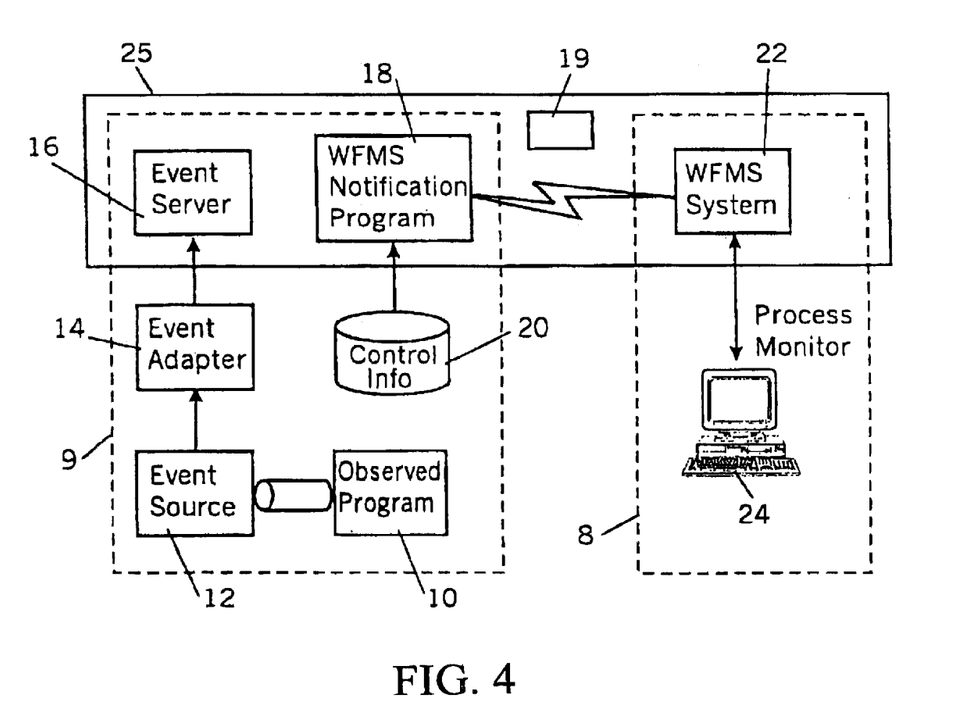
FIG. 4 is a schematic block diagram showing the essential elements of SMS and WFMS, in the error event of FIG. 3.
Figure 5:
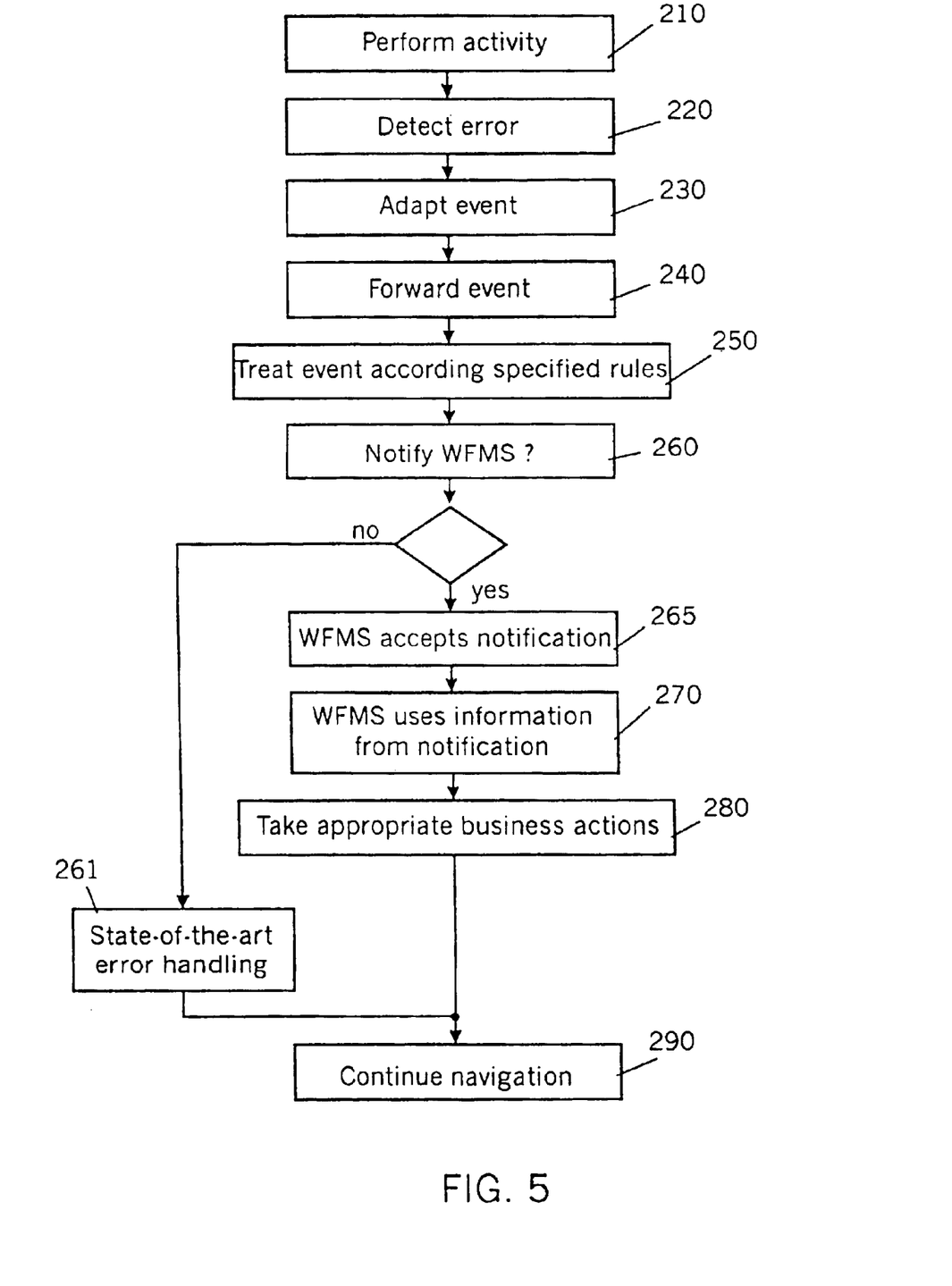
FIG. 5 is a schematic representation of a block diagram showing the control flow between SMS and WFMS improved according to the present invention, in case an error event occurs.

In FIG. 4 a program 10 which shall perform an activity-block 210 in FIG. 5 as a part of the underlying applications business process is monitored by the SMS. Any problem associated with the application program 10 is detected -block 220- by a program 12 that serves as event source 12.

FIG. 4 indicates that the event source 12 signals this event forward to the event adapter 14. The program that generates the event, which is the event source, typically uses program specific methods to detect that the program 10 does not function properly. If the program 10 for example reads from a queue, the event source program 12 could periodically inquire the queue to see if the number of messages in the queue is increasing or whether the program is still having contact with the queue. It should be noted that detecting problems and creating the raw data as explained above is typically a customer responsibility and is no essential feature of the method of the present invention.

The appropriate event information is then sent to the event adapter 14 that manages -block 230- the raw data as described above. In the example depicted in FIG. 4, where a program is monitored, such work consists principally of routing the event forward -block 240- to the event server 16.

The event server 16, treats then -block 250- the event according to customer specified rules. Depending on the type of error—see bifurcation in FIG. 5, an appropriate notification is sent -blocks 260, 265- to the WFMS 22. This is achieved by the event monitor calling a program 18 that sends an appropriate notification 19 to the WFMS. This program may need to access a control file 20 that contains, for example, information which one of a plurality of WFMSs should be informed.

When the event is not required to be notified to the WFMS—possibly due to an automatic error correction performed by the SMS—and state-of-the-art event handling -block 261- can also be allowed to be performed. The WFMS 22 accepts -block 265- the notification 19. and uses -block 270- the sent information to locate the affected process models and then determines the affected activities. As the process monitor knows the organizational aspects of the WFMS a proposal is possible. This information is then made available to any interested party via the process monitor's programming interface. This can then be graphically represented in the process monitor's console 24.

By that a process administrator is enabled to determine the reason of the problem and then to take appropriate actions -block 280-.

By establishing and maintaining the notification mechanism and a corresponding mechanism how to understand and process such notification 19 an inventional 'communication bridge' depicted as 25 is setup between SMS and WFMS as could be seen from above. By that, a tight integration of both systems is achieved.

Then, the workflow processing can continue -block 290-.

The following changes are advantageously undertaken to achieve the communication bridge 25 between SMS and WFMS in order to establish the tight integration just outlined above. These changes are needed operating under the base assumption that no changes to the actual SMS code are necessary; alternatively, the notification program 18 could be incorporated into the SMS itself.

If the restriction that the SMS can not be modified is lifted, that means the SMS is modified, some or all of the following changes might have to be modified or may even not be necessary anymore.

First, it is required to provide the necessary additions to the SMS's event definitions.

Secondly, it is required that the WFMS accepts external notifications, such as the one sent from the notification program triggered by the SMS's event monitor.

Optionally, extensions to the application programming interface of the WFMS can be supplied, and further optionally, an automatic analysis of errors can be supported.

Said changes are described next below:

Concerning first the additions, as was shown above, the WFMS is informed about events by the notification program 18 that is triggered by the SMS's event monitor. This term is used and deemed to include the event source 12, the event adapter 14 and the mechanism needed to locate and to message the IT-related error event. Said notification program 18 is typically supplied by the WFMS, however, this is not a necessity. Any program that is capable of informing the WFMS is sufficient. This program must then be defined as an action in the event server for each of the programs that are carried out.

All information that is needed by the program, such as which WFMS should be informed, can be generated by the WFMS since the WFMS has all necessary information in its repository. The WFMS could also help in generating the appropriate entries that need to into the definitions for the event server 16.

Next, the notification mechanism as an important part of the communication bridge 25 according to a preferred embodiment of the present invention works as follows:

The notification program 18 informs the WFMS by sending appropriate information to the WFMS, which then allows the WFMS to locate the impacted activities and processes and determine the correct course of actions. Typical pieces of information that are sent are the name of the failing program and the failure reason. Additional information may include for example expected down time. When the WFMS receives such a notification, it hands it over to it's process monitor component for further processing.

The information provided enable the process monitor to perform any kind of actions ranging from simply displaying an error message, issuing an alert to even take corrective actions, including reassigning of work to different people, to allow the workflow to continue.

In addition, the WFMS must be enhanced to understand the notification sent to it by a program, in particular the notification program that is triggered by the SMS. This new function is exposed either via an application programming interface or by a set of messages or by both.

If the process monitor component 24 of the WFMS and thus the WFMS is now the only interface for managing the system, it is beneficial -but not anyhow required- that the WFMS provides a single application programming interface for managing all system aspects. That means, the process monitor's API should be enhanced to expose the underlying SMS' application programming interface.

The process monitor's graphical end user interface could then use this enhanced application programming interface to allow a process administrator to obtain seamlessly all available information.

With the information available to the process monitor 24, it is possible for the process monitor to direct the process administrator directly to the cause of error, whether it is some organization-related problems or just the failure of some piece of hard- or software. Thus, the operator can undertake appropriate steps in order to support the business process disturbed by the event.

In a modification of the above described embodiment of the present invention the enterprise console of the SMS is enhanced instead of the process monitor.

This requires that a communication bridge or linkage is established between the WFMS and the SMS.

The event server of the SMS in enhanced to understand events generated by the WFMS. This is implemented by adding specific events with corresponding event actions. These event actions are then reflected at the enterprise console of the SMS.

The enterprise console is enhanced for processing said event actions by providing it with a set of predetermined rules in order to manage said business process. These rules can include all relevant information which could ever be provided by the WFMS itself concerning how the event hindered business process could be further continued in order to achieve the business goal.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A method for providing an improved consistency between a systems management system (SMS) and a respective distributed application in a workflow management system (WMS) used by a plurality of people, said distributed application operating in a distributed environment in a networked computer system in order to perform a plurality of business processes, each comprising a plurality of activities, the distributed application being monitored, and each error event of hardware or software of the distributed application being handled by an event server of said SMS, said method comprising the steps of:

for each error event, determining impacted business processes and activities within those impacted business processes which are impacted by said error event, including both (1) information on the impact of the error event on organization personnel monitored resources, including staff and people, of said distributed application and (2) information on the impact of the error event on information technology monitored resources, including hardware and software, of said SMS, displaying error information relating to hardware and/or software resources involved in said impacted business processes together with organzational information relating to organizational resources of said business processes, said organizational information being in turn available to a process monitor of said distributed application and including staff information, presenting said error information in conjunction with the impacted business processes impacted by said error event for achieving a business processes oriented solution to problems caused by said error event, providing a communication bridge between said SMS and said WFMS, involving said event server of said SMS into the communication bridge by involving a process monitor of said WFMS into event handling, and providing said process monitor with a set of predetermined rules in order to manage the impact of the error event on said impacted business processes.

2. The method according to claim 1, further comprising the step of, providing an application programming interface (API) common to said WFMS and said SMS in said process monitor of said WFMS for managing error event handling.

3. The method according to claim 2, further comprising the step of, providing said process monitor with a function for automatic error event analysis support related to said impacted business processes.

4. The method according to claim 3, further comprising the step of, providing said function for automatic error event analysis support with an end-user interface.

5. A method for providing an improved consistency between a systems management system (SMS) and a respective distributed application in a workflow management system (WMS) used by a plurality of people, said distributed application operating in a distributed environment in a networked computer system in order to perform a plurality of business processes, each comprising a plurality of activities, the distributed application being monitored and each error event of hardware or software of the distributed application being handled by an event server of said SMS, said method comprising the steps of:

for each error event, determining impacted business processes and activities within those impacted business processes which are impacted by said error event, including both (1) information on the impact of the error event on organization personnel monitored resources, including staff and people, of said distributed application and (2) information on the impact of the error event on information technology monitored resources, including hardware and software, of said SMS, displaying error information relating to hardware and/or software resources involved in said impacted business processes together with organizational information relating to organizational resources of said business processes, said organizational information being in turn available to a process monitor of said distributed application and including staff information, presenting said error information in conjunction with the impacted business processes impacted by said error event for achieving a business processes oriented solution to problems caused by said error event, providing a communication bridge between said SMS and said WFMS surprising the steps of by, involving said event server of said SMS into the communication bridge by involving an enterprise console of said SMS into error event handling, and providing said enterprise console with a set of predetermined rules in order to manage the impact of the error event on said impacted business processes.

6. The method according to claim 5, further comprising the step of, provide an application programming interface (API) common to said SMS and said WFMS in said enterprise console of said SMS for managing WFMS error event handling.

7. The method according to claim 6, further comprising the step of, providing said enterprise console with a function for automatic error event analysis support processes.

8. The method according to claim 7, further comprising the step of, providing said function for automatic error event analysis support with an end-user interface.

* * * * *

UNITED STATES PATENT AND TRADEMARK OFFICE
CERTIFICATE OF CORRECTION

PATENT NO. : 6,820,118 B1
DATED : November 16, 2004
INVENTOR(S) : Leymann et al.

It is certified that error appears in the above-identified patent and that said Letters Patent is hereby corrected as shown below:

Title page,
Item [56], References Cited, OTHER PUBLICATIONS, please insert :
-- "Subprocess Synchronization in Workflow Management Systems", IBM Technaical Disclosure Bulletin, No. 436, Page 1484, August 1, 2000.

"Predicting the future Processing of Business Process", IBM Technical Disclosure Bulletin, Vol. 42, No. 424, August 1, 1999. --
Item [57], ABSTRACT,
Line 11, "either of enhancing the" should be -- either of: enhancing the --

Column 11,
Line 14, "performed. The WFMS" should be -- performed. --

Column 12,
Line 17, "application.systems," should be -- application systems, --

Column 13
Line 54, "the notification 19. and" should be -- the notification 19 and --

Column 16,
Line 61, "said WFMS surprising the steps of by," should be -- said WFMS by --

Signed and Sealed this

Twenty-eighth Day of June, 2005

JON W. DUDAS
*Director of the United States Patent and Trademark Office*